J. R. GARDNER.
SWEEP MECHANISM FOR HAY PRESSES.
APPLICATION FILED APR. 11, 1910.
966,088.
Patented Aug. 2, 1910.
2 SHEETS—SHEET 1.
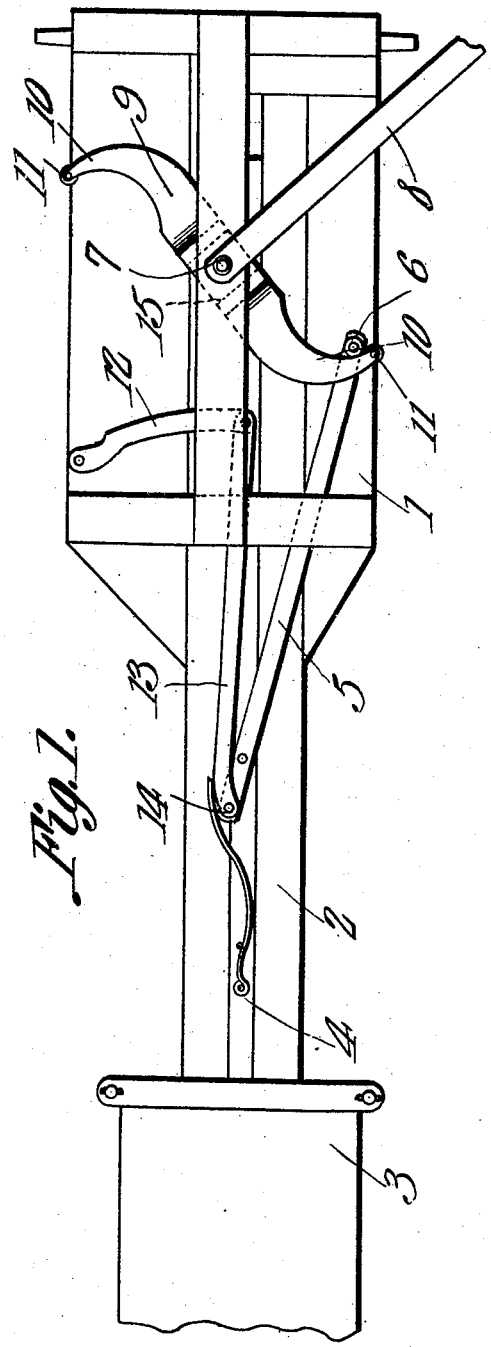
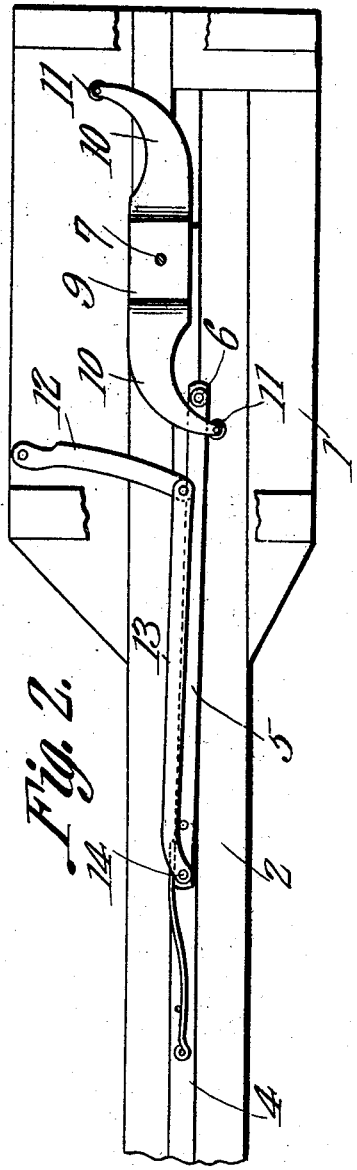
Witnesses
John R. Gardner,
Inventor
by C. A. Snow & Co.
Attorneys

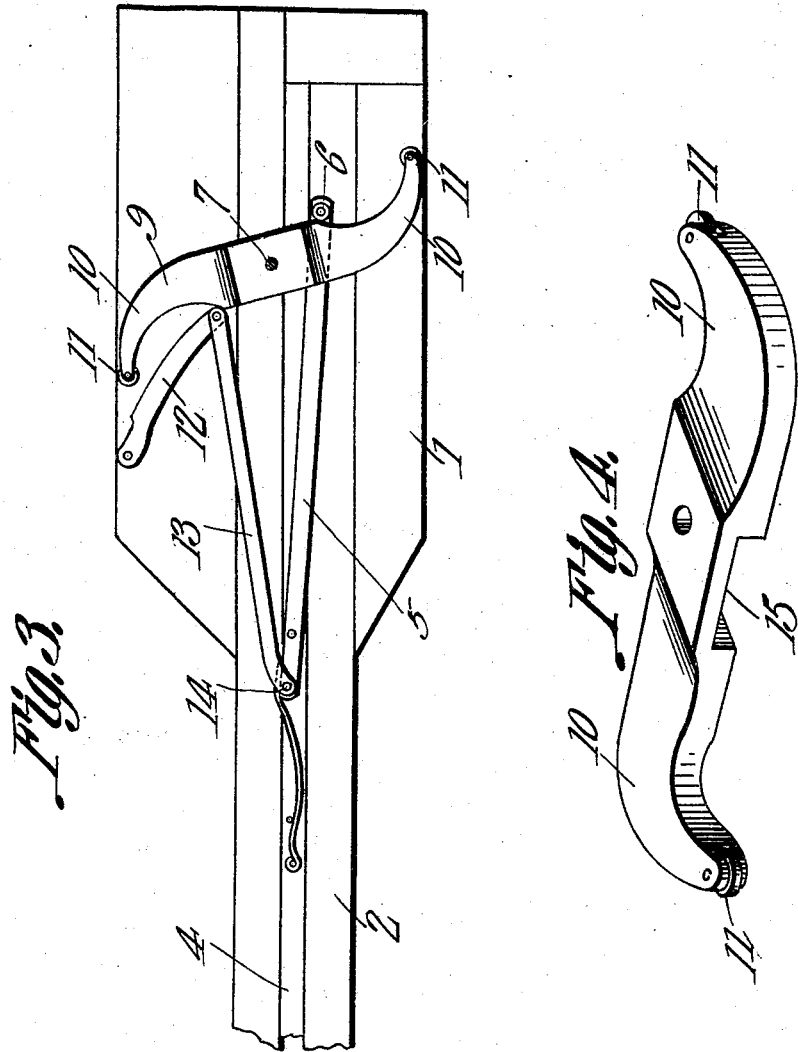

UNITED STATES PATENT OFFICE.

JOHN R. GARDNER, OF ELM CITY, NORTH CAROLINA.

SWEEP MECHANISM FOR HAY-PRESSES.

966,088.  Specification of Letters Patent.  Patented Aug. 2, 1910.

Application filed April 11, 1910. Serial No. 554,673.

*To all whom it may concern:*

Be it known that I, JOHN R. GARDNER, a citizen of the United States, residing at Elm City, in the county of Wilson and State of North Carolina, have invented a new and useful Sweep Mechanism for Hay-Presses, of which the following is a specification.

This invention relates to a sweep mechanism for hay presses and it consists of a novel construction and arrangement of its parts as hereinafter shown and described.

The object of the invention is to provide a mechanism of the character indicated which is of simple construction and which includes parts so arranged as to increase the leverage upon the active stroke of the plunger bar.

With this object in view the sweep mechanism includes a frame in which is journaled a shaft and to which is attached a sweep. An arm is fixed at a point intermediate its ends to the said shaft and is provided at its ends with curved or hooked extremities. A plunger bar is mounted for reciprocation and a link is pivotally connected with one end of the same. A roller is journaled at the other end of said link and is adapted to be engaged alternately by the curved or hooked extremities of the arm. A lever is fulcrumed upon the sweep frame and a link pivotally connects one end of said lever with the inner end of the first said link. The lever also lies within the path of movement of the extremities of the arm and a spring is mounted upon the plunger bar and bears at its free end against the end of the first said link and is under tension with a tendency to hold the outer end of the first said link toward the shaft journaled in the frame.

In the accompanying drawings:—Figure 1 is a top plan view of the sweep mechanism. Fig. 2 is a top plan view of the same with parts removed showing a difference in position which the parts may assume from that illustrated in Fig. 1. Fig. 3 is a top plan view of the sweep mechanism with parts removed showing still other positions of the parts which may be assumed during the operation of the sweep mechanism. Fig. 4 is a detailed perspective view of the arm forming a part of the sweep mechanism.

The sweep mechanism includes a frame 1 which is connected by means of beams 2 with a baling chamber 3. A plunger bar 4 is mounted for reciprocation between the beams 2 and a link 5 is pivotally connected with the outer end portion of the said bar 4. At its outer end the link 5 is provided with an upstanding roller 6 journaled for free rotation. A vertically disposed shaft 7 is journaled for rotation in the frame 1 and a sweep 8 is fixed at the upper end of the said shaft. An arm 9 is fixed to the upper portion of the shaft 7 and is provided at its end with curved or hooked extremities. Rollers 11 are journaled at the extremities of the hooked or curved portions 10 of the arm 9.

A lever 12 is fulcrumed to the sweep frame 1 and is located in the path of movement of the rollers 11 carried by the arm 9. A link 13 is pivoted at one end to the free end of the lever 12 and at its other end the said link 13 is pivoted to the inner end of the link 5. A spring 14 is fixed to the plunger bar 4 and at its free end bears against the inner end portion of the link 5 and is under tension with a tendency to hold the outer end of the link 5 toward the shaft 7. The roller 6 carried by the link 5 is located in the path of movement of the curved or hooked extremities 10 of the arm 9. The arm 9 is provided upon its under side and in the vicinity of the shaft 7 with a recess 15 the side edges of which are spaced for some distance beyond the opposite sides of the said shaft 7.

The operation of the sweep mechanism is as follows: Presuming that draft animals are attached to the sweep the shaft 7 is rotated in its bearings in the frame 1 and the arm 9 is carried around with the same. Presuming that the parts are in the position as illustrated in Fig. 2 of the drawing one of the curved or hooked extremities 10 of the arm 9 will engage the roller 6 carried by the link 5 and the outer end of the said link will be swung in an outwardly direction as indicated in Fig. 1 of the drawing. At the same time the said link 5 will be moved longitudinally and the plunger bar 4 will be moved correspondingly between the beams 2. This is on the compression stroke of the plunger as the end of the arm 9 which is in engagement with the roller 6 continues to move about the axis of the shaft 7 the plunger bar 4 is continued in its compression stroke in the manner as illustrated in Fig. 3 of the drawing and during this movement the roller 6 will travel along the curved or hooked extremities 10 of the bar 7 and will assume the position as shown in Fig. 3.

That is to say the link 5 after having been brought out of positive alinement with the plunger bar 4 will gradually move toward a position approximately in alinement with the same which movement is accelerated by the pressure of the spring 14 which is distorted during the initial compression stroke of the bar 4. When the roller 6 arrives at the edge of the recess 15 in the under side of the arm 9 the said roller passes through said recess and simultaneously or approximately so the roller 11 at the opposite end of the arm 9 engages the lever 12 (which has been previously moved back as indicated in Fig. 3 of the drawing) and the free end of the lever 12 is forced toward the baling chamber 3. Through the link 13 the plunger bar 4 is moved back between the beams 2 in its retractive stroke and at the time that the roller 11 which is in engagement with the lever 12 escapes the same the parts are in the position as illustrated in Fig. 2 of the drawing or approximately so. Thus it will be seen that during the actuation of the plunger bar 4 upon its compression stroke it is first moved by the link 5 when the outer end of the said link is in the vicinity of the outer end of one of the hooked portions 10 of the arm 9 and as the bar 4 gradually approaches the termination of the compression stroke the outer end of the link 5 gradually approaches the pivot upon which the arm 9 is mounted. Thus while the rapidity of the movement of the plunger bar 4 as it approaches the termination of its compression stroke may be diminished the leverage through the sweep 8 and shaft 7 and arm 9 is gradually increased and therefore the compression of the hay within the baling chamber 3 is more positively effected and with less strain upon the draft animals connected with the sweep 8.

Having described the invention what I claim as new and desire to secure by Letters Patent is:—

1. A sweep mechanism comprising a frame, beams attached thereto, a plunger bar mounted for reciprocation along the beam, a shaft journaled for rotation in the frame, a sweep attached to the shaft, an arm fixed to the shaft and having curved extremities, a link pivoted to the plunger bar and having a roller adapted to be engaged successively a lever fulcrumed to the frame, the link pivoted at one end to said lever and the other end to the first said link, said lever being located in the path of movement of the extremities of the arm.

2. A sweep mechanism comprising a frame, beams attached thereto, a plunger bar mounted for reciprocation longitudinally of the beams, a shaft journaled in the frame, a sweep attached to the shaft, an arm fixed to the shaft and having curved extremities provided at their ends with rollers, a link pivoted to the plunger bar at its outer end a roller located in the path of movement of the curved extremities of the arms, said arms having at a point intermediate its ends a transversely disposed recess through which the said roller is adapted to pass, a lever fulcrumed to the frame and located in the path of movement of the rollers at the ends of the arms and a link pivotally connected at one end to the free end of said lever and pivotally connected at its other end with the inner end of the first said link.

In testimony that I claim the foregoing as my own, I have hereto affixed my signature in the presence of two witnesses.

JOHN R. GARDNER.

Witnesses:
W. C. PATTERSON,
G. C. COBB.